United States Patent [19]

Kankawa et al.

[11] Patent Number: 5,194,203

[45] Date of Patent: Mar. 16, 1993

[54] METHODS OF REMOVING BINDER FROM POWDER MOLDINGS

[75] Inventors: Yoshimitsu Kankawa; Yasunari Kaneko, both of Otsu; Norio Kasahara, Nirasaki, all of Japan

[73] Assignee: Mitsui Mining & Smelting Co., Ltd., Tokyo, Japan

[21] Appl. No.: 815,428

[22] Filed: Dec. 31, 1991

[30] Foreign Application Priority Data

Feb. 28, 1991 [JP] Japan ................................. 3-055676
Mar. 29, 1991 [JP] Japan ................................. 3-089133

[51] Int. Cl.⁵ .............................................. C04B 41/91
[52] U.S. Cl. ......................................... 264/63; 264/344; 419/10; 419/36; 419/37; 419/65
[58] Field of Search .................... 264/63, 344; 419/37, 419/36, 10, 65

[56] References Cited

U.S. PATENT DOCUMENTS 4,283,360  8/1981  Henmi ................................. 264/63
5,059,388 10/1991  Kihara et al. ...................... 264/63

FOREIGN PATENT DOCUMENTS 56-108802  8/1981  Japan .
2-101101   4/1990  Japan .

OTHER PUBLICATIONS

The Condensed Chemical Dictionary, Reinhold Pub. Corp., New York, 1961, p. 912.
English Language Abstract of Japanese Patent Application No. 56-108802.
English Language Abstract of Japanese Patent Application No. 2-101101.

*Primary Examiner*—James Derrington
*Attorney, Agent, or Firm*—Flynn, Thiel, Boutell & Tanis

[57] ABSTRACT

A method of mixing a powder material and a binder in a predetermined ratio and kneading the mixture so that substantially whole surface of the powder particles are covered by the binder, molding the kneaded mixture into the shapes of desired products, then removing the binder from the moldings without causing expansion or cracks in the moldings before sintering. The binder comprises one or more organic binding substances soluble to an alcohol or to an mixed solvent of an alcohol and benzene or one or more ketones and one or more organic binding substances insoluble to the alcohol or to the mixed solvent. The moldings are put in contact with the alcohol or the mixed solvent to extract the organic binding substances soluble to the alcohol or to the mixed solvent from the moldings. The organic binding substances insoluble to the alcohol or to the mixed solvent are then removed by heat-decomposition. The dissolution of the organic binding substances soluble to the alcohol or to the mixed solvent can be controlled to an appropriate rate by the constituents of the mixed solvent and their ratio of mixture.

By this method, it is made possible to remove the binder from the moldings made of powders with small particle sizes and large specific surface areas, which are difficult to remove the binder from without causing defects by the conventional methods, in short time without causing expansion or cracks in them.

8 Claims, 1 Drawing Sheet

METHODS OF REMOVING BINDER FROM POWDER MOLDINGS

BACKGROUND OF THE INVENTION a) Field of the Invention

The present invention relates to improved methods of kneading a powder of metal, ceramic, cermet, or other materials with a binder, molding the kneaded powder, and removing the binder from the moldings before sintering them to obtain products.

b) Description of the Prior Art

Injection molding is widely used as a method of forming complicated-shaped metal and ceramic products out of powders. In injection molding, various organic compounds or thermoplastic resins are added to a powder to fluidize it; the powder containing added binder is hot-kneaded, and injection-molded; the binder is removed from the moldings obtained before sintering; and the moldings are sintered into products. In this process, removal of the binders is most important to obtain products without defects. There are two methods conventionally used for removing the binder from powder moldings: the heat decomposition method in which an organic binder is decomposed and gasified by heating, and the dissolution method in which an organic binder is extracted from moldings with an organic solvent.

In the thermal decomposition method, rapid decomposition and gasification of an organic binder raise the internal pressure of the moldings and thereby cause cracks or expansion in them. The decomposition and gasification of a binder therefore must be carried out gradually, and take a long time. Especially for a powder with a small particle size and a large specific surface area to which a larger amount of binder must be added to fluidize it for injection molding, complicated techniques such as heating moldings step by step to higher temperatures are necessary for the removal of the binder, and the removal of the binder takes a longer time. Though addition of volatile substances to binders is thought of, those substances can evaporate during kneading and molding, and make it difficult to reuse the sprue and runner part of moldings.

In the dissolution method, an organic binder is extracted from moldings with an organic solvent, and the pores left by the dissolved out binder serve as passages of decomposed and gasified binder. Therefore, remaining binder is easily removed by heat-decomposition without causing defects in the moldings. In the dissolution method, however, liquid materials such as mineral oils, fatty acid-derived oils, or natural oils are used in large quantitites for a binder. But these oils can separate from the powder during kneading and ooze out of the moldings, so as to make it difficult to store the kneaded powder and moldings stable for a long time. Moreover, oils move to the surface of moldings during storage and can cause cracks or expansion in the moldings during extraction.

A method of dissolving out a plasticizer and a lubricant in an organic binder using hot water is also thought of. In this method, however, the stability of the kneaded powder containing them and the strength of the moldings decrease as the proportion of the plasticizer and the lubricant added increase, whereas cracks and expansion can be caused by heat decomposition and gasification of the binder if their proportion is low.

Disclosed in Japanese Patent Provisional Publication gazette No. 101101/1990 is another dissolution method in which water-soluble resins are used for a binder and they are dissolved out with water. This method has an advantage of using water which is lower in cost and safer to handle than an organic binder. Water, though, is inferior to an organic solvent in the permeating ability into moldings and evaporativity. Therefore, extraction of the binder and drying of moldings after the extraction take a longer time, especially for ceramic or metal powders with a specific surface area of 10 $m^2/g$ or greater, to which a large quantity of an organic binder must be added. Moreover, when heating moldings to remove the water that has permeated into the moldings, the problems of cracks and expansion can arise as a higher temperature is used. In addition, powders of materials which can rust in contact with water, such as iron and copper, and those of materials which react with water and generate gases, such as ceramic $Si_3N_4$ which generates ammonia gas, cannot be used.

SUMMARY OF THE INVENTION

The object of the present invention is to provide improved methods of removing a binder from moldings formed of powders of ceramic, metal, cermet or other materials, especially from those formed of powders with small particle sizes and large specific surface areas which are difficult to remove a binder from by the above conventional methods, in a shorter time without causing defects.

The present invention has attained the above object by the following methods of kneading a powder of metal, ceramic, cermet, or other materials with a binder, molding the kneaded powder, and removing the binder from the moldings before sintering them to obtain products.

The first method of the present invention comprises mixing a powder material and a binder in a predetermined ratio and kneading the mixture so that substantially the entire surfaces of the powder particles are covered by the binder, molding the kneaded mixture into the shapes of desired products, then removing the binder from the moldings, and is characterized by the followings:

(a) Said binder comprises one or more alcohol-soluble organic binding substances and one or more alcohol-insoluble thermoplastic resins;

(b) Said moldings are put in contact with an alcohol to extract said alcohol-soluble organic binding substances from said moldings; and (c) Said alcohol-insoluble thermoplastic resins remaining in said moldings were removed by heat-decomposition.

The second method of the present invention comprises mixing a powder material and a binder in a predetermined ratio and kneading the mixture so that substantially the entire surfaces of the powder particles are covered by the binder, molding the kneaded mixture into the shapes of desired products, then removing the binder from the moldings, and is characterized by the followings:

(a) Said binder comprises one or more organic binding substances soluble to an alcohol and an organic solvent other than alcohol and one or more organic binding substances insoluble in both the alcohol and the organic solvent, the organic solvent comprising benzene, one or more ketones, or a mixture of them;

(b) Said moldings are put in contact with a mixed solvent of said alcohol and the organic solvent to extract said organic binding substances soluble to the mixed solvent, the mixture ratio of said mixed solvent being determined so as to control the dissolution of the organic binding substances to an appropriate rate;

(c) Said organic binding substances insoluble to said mixed solvent and remaining in said moldings are removed by heat-decomposition.

Thus using a binder comprising one or more organic binding substances soluble to an alcohol or to a mixture of an alcohol and an organic solvent, and one or more thermoplastic resins not soluble to the alcohol or to the alcohol or the organic solvent, and removing the binder first by extracting the organic binding substances in it with the alcohol or with the mixed solvent, next by heat-decomposing the remaining thermoplastic resins, the methods of the present invention make it possible to remove the binder from moldings formed of a powder with small particle sizes and large specific surface areas in a shorter time without causing defects. Further, these methods are applicable to wider materials than the above conventional method which uses water as the extraction medium.

BRIEF DESCRIPTION OF THE DRAWINGS

The accompanying drawing shows the relationship between the extraction time and the dissolution rate of the organic binder of the moldings of examples of the present invention.

DETAILED DESCRIPTION OF THE INVENTION

Figure 1:
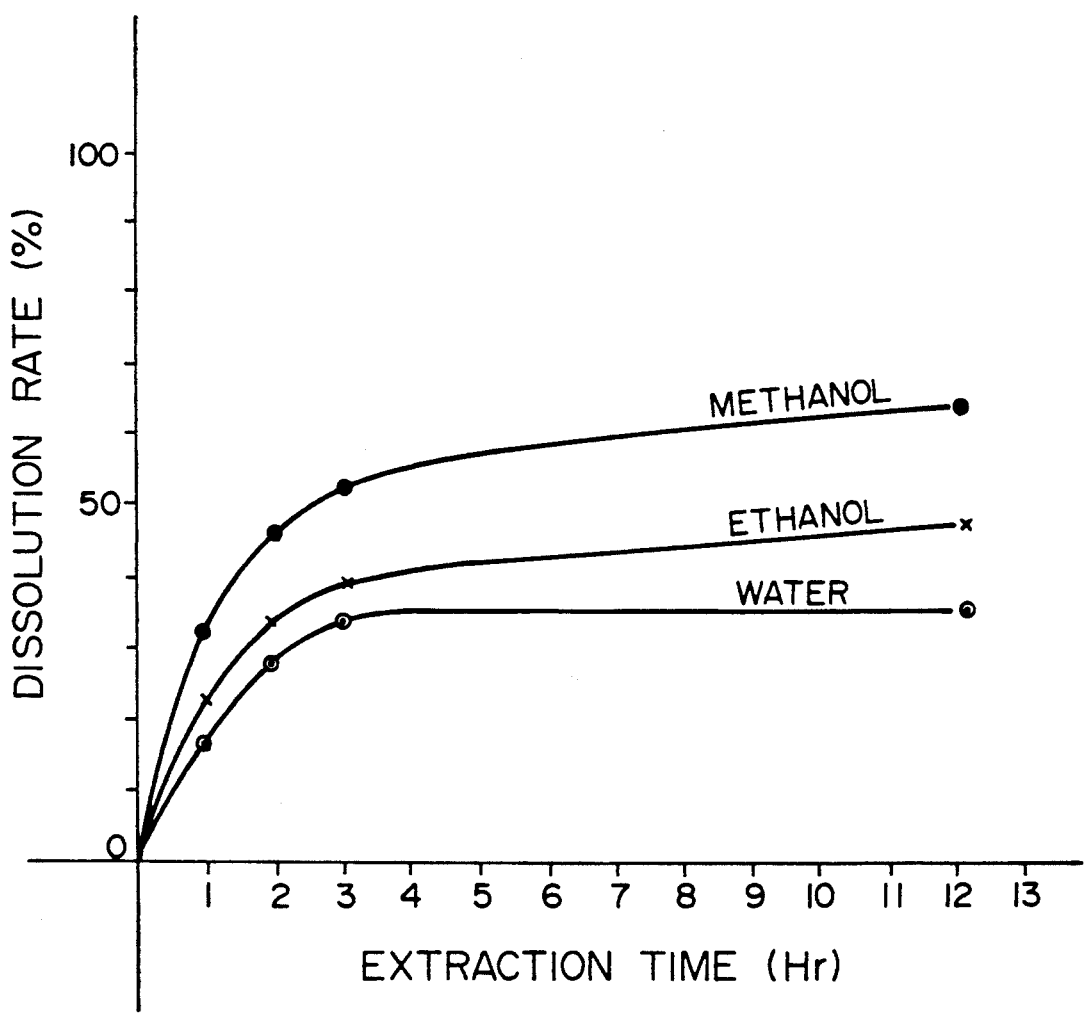

For the alcohol-soluble organic binding substance used in the first method of the present invention, polyethylene glycol, diethylene glycol, triethylene glycol, tetraethylene glycol, ethylene carbonate, glycerol ether, or phthalate ester, for example, can be used.

Substances usable for the alcohol-insoluble thermoplastic substance include polyethylene, polypropylene, polystyrene, ethylene-vinyl acetate copolymer, nylon, parafin wax, atactic polypropylene, or polybutyl methacrylate.

For the organic binding substance soluble to both an alcohol and an organic solvent comprising benzene, one or more ketones, or a mixture of them, carboxy-vinyl polymer, polyethylene glycol, polypropylene glycol, vinyl acetate resin, polyethylene glycol monostearate, monoglyceride oleate, diglyceride oleate, polyoxyethylene sorbitan monolaurate, or sorbitan monolaurate, for example, can be used.

Substances usable for the organic binding substances insoluble to the mixed solvent include polyethylene, polypropylene, polystyrene, ethylene-vinyl acetate copolymer, nylon, paraffin wax, atactic polypropylene, or polybutyl methacrylate.

A preferably substance for the organic binding substance soluble to alcohol or to the mixed solvent is polyethylene glycol. Taking into consideration the solubility to an alcohol or to the mixed solvent, polyethylene glycol with molecular weight of 200 to 4,000 is desirable. By using polyethylene glycol of different molecular weights in mixture, the strength of moldings can be increased and its dissolution into an alcohol or the mixed solvent can be controlled.

Ethylene carbonate, diethylene glycol, glycerol ether, and polyethylene glycol have a good compatibility with ethylene-vinyl acetate copolymer, atactic polypropylene, polybutyl methacrylate, and polystyrene used as the thermoplastic resin insoluble to alcohol and to the mixed solvent, serve as a plasticizer and have the effects of lowering the molding temperature. In addition, they quickly dissolve in the mixed solvent at ordinary temperature, and therefore can be easily extracted from moldings with the mixed solvent without causing any problem.

Next described in detail is the molding of a powder and removal of the binder from moldings by the methods of the present invention.

A ceramic or metal powder is mixed with a binder, the mixture is hot-kneaded, the kneaded mixture is formed into pellets, the pellets are used for injection-molding. The binder used comprises one or more of the above organic binding substances soluble to an alcohol or to the mixed solvent, and at least one of the above thermoplastic substances insoluble to the alcohol or to the mixed solvent.

The binder is then removed from the moldings by the following removal process.

First, the organic binding substances are extracted using an alcohol or the mixed solvent. For this extraction process, methods such as putting the moldings in the solvent with continuous stirring, and spraying the solvent continously over the moldings, are preferable to shorten the time taken for the extraction.

After the extraction of the organic binding substances, the moldings are subjected to a debinding process, in which the remaining thermoplastic substances insoluble to the alcohol and to the mixed solvent are removed by heating at ordinary pressure, a reduced pressure, or a vacuum in a debinding furnace.

In the extraction of the organic binding substances, the dissolution rate can be controlled by the kind of alcohol or ketones used or by the mixture ratio of the alcohol, benzene, and the ketones. The following advantage results from this controllability of the dissolution rate: too rapid dissolution can be prevented by increasing the proportion of benzene or ketones to an alcohol when the powder used has a small average particle size and a large specific surface area and therefore the volume of the organic binding substances to be added is large compared to that of the powder, and when the molding is thin; the time required for the dissolution of the organic binding substances and the evaporation of the solvent thereafter can be made shorter by increasing the proportion of benzene or ketones to an alcohol when the powder has a large average particle size and has a small specific surface area and therefore the volume of the organic binding substances to be added is small compared to that of the powder, and when the molding is thick.

After the binder is removed, the moldings are sintered into products.

EXAMPLE 1

18 parts by weight of polyethylene glycol as an alcohol-soluble thermoplastic resin, and 6.5 parts by weight of ethylene-vinyl acetate resin and 4.0 parts by weight of atactic polypropylene resin as alcohol-insoluble thermoplastic resins were added to 100 parts by weight of zirconia ceramic powder (average particle size: 3 $\mu m$, specific surface area: 15 $m^2/g$). The mixture was kneaded by a kneader at 140° C. for 30 minutes. This kneaded mixture was ground and then molded into top-shaped samples by a plunger-type vertical injection machine.

The thus-obtained moldings were put in methanol and ethanol separately at ordinary temperature for 12 hours, then dried in a vacuum for 30 minutes. While the moldings were put in the alcohols, the dissolution of the binder was measured at intervals, and the dissolution rate was calculated by dividing the quantity dissolved by the total quantity of the organic binding substance.

The moldings dried were next put in a hot-air circulation furnace, heated to 420° C. at a rising rate of 100° C./hour, and maintained at that temperature for 2 hours. Thus binder-removed moldings were obtained. These binder-removed moldings were checked for defects, and the results are shown in Table 1. Moldings made of the same powder and binder were subjected to the same binder-removing process using water in place for alcohol for a comparative experiment, and the results are also shown in Table 1.

As shown in Table 1, the dissolution rate in methanol according to the present invention was about 1.5 times greater than in water. Further, moldings put in methanol for 1 hour were confirmed to be free from expansion, cracks, or deformation. On the other hand, cracks were found in the experimental samples. The samples with the binder removed were then sintered at 1,550° C. for 6 hours in an air furnace, and the density of the sintered samples were measured. The density was 6.02 g/cm$^3$ (relative density 99.5%), and it was confirmed that they had a high density.

TABLE 1

| | Length of time put in solvent | Dissolution rate (%) | Temp. rising rate (100° C./hr) |
|---|---|---|---|
| Ex. 1 | | | |
| Methanol | 1 | 32.67 | ○ |
| | 2 | 46.63 | ○ |
| | 3 | 53.74 | ○ |
| | 12 | 62.62 | ○ |
| Ethanol | 1 | 22.93 | Δ |
| | 2 | 33.16 | ○ |
| | 3 | 38.84 | ○ |
| | 12 | 46.67 | ○ |
| Com. Ex. | | | |
| Water | 1 | 16.20 | x |
| | 2 | 26.81 | Δ |
| | 3 | 34.14 | ○ |
| | 12 | 34.54 | ○ |

○: No defect
Δ: Cracked
x: Collapsed

EXAMPLE 2

5 parts by weight of polyethylene glycol, 4 parts by weight of ethylene-vinyl acetate resin, 2 parts by weight of atactic polypropylene resin, and 2 parts by weight of surface-active agent were added to 100 parts by weight of iron powder (average particle size: 10 μm). This mixture was kneaded and injection-molded into the same shape of samples in the same manner as in example 1.

The thus-obtained samples were put in methanol for 3 hours, then vacuum-dried for 30 minutes. The dissolution rate by the extraction treatment was measured to be 40%. The dried samples were next debinded and then sintered in vacuum. The density of the sintered samples thus obtained was measured, and the density was 7.60 g/cm$^3$ (relative density 97.4%). Some samples were subjected to the same extraction treatment except that water was used in place of methanol for composition. Those samples were rusted and corroded.

EXAMPLE 3

13 parts by weight of polyethylene glycol as a thermoplastic resin soluble to alcohol and an organic solvent, and 5 parts by weight of ethylene-vinyl acetate resin and 3 parts by weight of atactic polypropylene resin as a thermoplastic resin insoluble to alcohol nor an organic resin were added to 100 parts by weight of alumina ceramic powder (average particle size: 0.6 μm), and the mixture was kneaded at 140° C. for 60 minutes in a kneader. The mixture kneaded was ground and molded into cylindrical rods 6 mm in diameter by a screw-type injection mold.

These samples were put in different alcohols or organic solvents or mixtures of them at ordinary temperature (about 25° C.) for two hours, then vacuum-dried for 30 minutes. In this extraction treatment, the dissolution rate in each solvent was measured, and the results were shown in Tables 2 to 9.

TABLE 2

| Mixture ratio (% by vol.) | | Dissolution |
|---|---|---|
| Ethanol | Benzene | (%) |
| 100 | 0 | 19.5 |
| 80 | 20 | 23.5 |
| 50 | 50 | Cracked |
| 20 | 80 | Collapsed |
| 0 | 100 | Collapsed |

TABLE 3

| Mixture ratio (% by vol.) | | Dissolution |
|---|---|---|
| Ethanol | Acetone | (%) |
| 100 | 0 | 19.5 |
| 80 | 20 | 22.6 |
| 50 | 50 | 27.7 |
| 20 | 80 | 31.5 |
| 0 | 100 | 31.9 |

TABLE 4

| Mixture ratio (% by vol.) | | Dissolution |
|---|---|---|
| Ethanol | Xylene | (%) |
| 100 | 0 | 19.5 |
| 90 | 10 | 20.8 |
| 80 | 20 | 21.3 |
| 50 | 50 | Cracked |

TABLE 5

| Mixture ratio (% by vol.) | | Dissolution |
|---|---|---|
| Ethanol | Toluene | (%) |
| 100 | 0 | 19.5 |
| 90 | 10 | 22.2 |
| 80 | 20 | 23.9 |
| 50 | 50 | Cracked |

TABLE 6

| Mixture ratio (% by vol.) | | Dissolution |
|---|---|---|
| Isopropyl alcohol | Benzene | (%) |
| 100 | 0 | 12.8 |
| 80 | 20 | 20.6 |
| 50 | 50 | 32.9 |
| 20 | 80 | Cracked |
| 0 | 100 | Dissolved |

TABLE 7

| Mixture ratio (% by vol.) | | Dissolution |
|---|---|---|
| Isopropyl alcohol | Acetone | (%) |
| 100 | 0 | 12.8 |
| 80 | 20 | 18.6 |
| 50 | 50 | 25.7 |
| 20 | 80 | 30.2 |
| 0 | 100 | Cracked |

TABLE 8

| Mixture ratio (% by vol.) | | Dissolution |
|---|---|---|
| Isopropyl alcohol | Xylene | (%) |
| 100 | 0 | 12.8 |
| 90 | 10 | 15.1 |
| 80 | 20 | 18.6 |
| 50 | 50 | Cracked |

TABLE 9

| Mixture ratio (% by vol.) | | Dissolution |
|---|---|---|
| Isopropyl alcohol | Toluene | (%) |
| 100 | 0 | 12.8 |
| 90 | 10 | 14.7 |
| 80 | 20 | 18.2 |
| 50 | 50 | Cracked |

What is claimed is:

1. In a method which comprises mixing a powder material and a binder in a predetermined ratio and kneading the mixture so that substantially the entire surfaces of the powder particles are covered by the binder, molding the kneaded mixture into the shape of a desired product, then removing the binder from the molding without causing expansion or cracks in the molding before sintering, wherein the improvement comprises:

(a) said binder comprises a mixture of (1) one or more first organic binding substances soluble in an alcohol and in a non-alcohol organic solvent selected from the group consisting of benzene, xylene, toluene, ketones and mixtures thereof, and (2) one or more second organic binding substances insoluble in said alcohol and said non-alcohol organic solvent;

(b) said molding is contacted with a mixture of said alcohol and said non-alcohol organic solvent to extract from said molding said organic binding substances soluble in said mixed solvent, the mixture ratio of said mixed solvent being determined so as to control the dissolution of the organic binding substances to an appropriate rate so as to prevent cracking and collapsing of said molding; and (c) then removing said organic binding substances insoluble in said mixed solvent and remaining in said molding by heat-decomposition.

2. The method of claim 1, in which said first organic binding substance soluble in said alcohol and said non-alcohol organic solvent is selected from the group consisting of carboxy-vinyl polymer, polyethylene glycol, polypropylene glycol, vinyl acetate resin, polyethylene glycol monostearate, monoglyceride oleate, diglyceride oleate, polyoxyethylene sorbitan monolaurate and sorbitan monolaurate.

3. The method of claim 1, in which said second organic binding substance insoluble in said alcohol and said non-alcohol organic solvent is selected from the group consisting of polyethylene, polypropylene, polystyrene, ethylene-vinyl acetate copolymer, nylon, paraffin wax, atactic polypropylene polybutyl methacrylate and mixtures thereof.

4. The method of claim 1, in which said powder material is a metal, ceramic, or cement.

5. The method of claim 1, in which said first organic binding substance soluble in said alcohol and said non-alcohol organic solvent is a mixture of polyethylene glycols with molecular weights of 200 to 4,000.

6. The method of claim 1 in which said alcohol is selected from the group consisting of methanol, ethanol and isopropyl alcohol.

7. The method of claim 1 in which said powder material has a specific surface area of at least 10 $m^2/g$.

8. The method of claim 7 in which said first organic binding substance is polyethylene glycol having a molecular weight of from 200 to 4000, said second organic binding substance is a mixture of atactic polypropylene and ethylene-vinyl acetate copolymer, said alcohol is selected from the group consisting of ethanol and isopropyl alcohol and said non-alcohol organic solvent is selected from the group consisting of benzene, xylene, toluene and acetone.

* * * * *